United States Patent
Buhler et al.

(10) Patent No.: US 10,219,422 B2
(45) Date of Patent: Mar. 5, 2019

(54) MACHINE-TO-MACHINE SHARING OF WAYLINE DEVIATION INFORMATION

(71) Applicant: AGCO Corporation, Hessston, KS (US)

(72) Inventors: Timothy Dan Buhler, Newton, KS (US); Gerald R. Johnson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 91 days.

(21) Appl. No.: 15/252,372

(22) Filed: Aug. 31, 2016

(65) Prior Publication Data

US 2017/0060134 A1  Mar. 2, 2017

Related U.S. Application Data

(60) Provisional application No. 62/212,625, filed on Sep. 1, 2015.

(51) Int. Cl.
| | |
|---|---|
| A01B 69/04 | (2006.01) |
| A01B 79/00 | (2006.01) |
| G05D 1/02 | (2006.01) |
| H04B 1/06 | (2006.01) |

(52) U.S. Cl.
CPC .......... *A01B 69/008* (2013.01); *A01B 79/005* (2013.01); *G05D 1/0295* (2013.01); *G05D 2201/0201* (2013.01); *H04B 1/06* (2013.01)

(58) Field of Classification Search
None
See application file for complete search history.

(56) References Cited

U.S. PATENT DOCUMENTS

| | | |
|---|---|---|
| 6,205,381 B1 | 3/2001 | Motz et al. |
| 6,643,576 B1 | 11/2003 | O'Connor et al. |
| 8,046,139 B2 | 10/2011 | Diekhans et al. |
| 8,738,238 B2 | 5/2014 | Rekow |
| 2011/0160961 A1 | 6/2011 | Wollenhaupt et al. |
| 2012/0215394 A1* | 8/2012 | Wang ................ A01D 41/1278 701/24 |
| 2014/0336818 A1* | 11/2014 | Posselius ............ G05D 1/0295 700/248 |
| 2016/0071418 A1* | 3/2016 | Oshida ..................... G08G 1/22 701/23 |

FOREIGN PATENT DOCUMENTS

| | | | |
|---|---|---|---|
| JP | 2002266672 A | * | 9/2002 |
| WO | 2011/059932 A1 | | 5/2011 |
| WO | 2012/110543 A1 | | 8/2012 |
| WO | 2014/183042 A1 | | 11/2014 |

OTHER PUBLICATIONS

Ugawa, JP 2002266672, EPO translation Jun. 30, 2018. (Year: 2018).*
European Patent Office, International Search Report for related EP Application No. 16186433.5, report dated Jan. 26, 2017.

* cited by examiner

*Primary Examiner* — Kevin P Mahne (57) ABSTRACT

In one embodiment, a method comprising wirelessly receiving a signal comprising information about a deviation to a first wayline; and applying the deviation to a second wayline.

1 Claim, 8 Drawing Sheets

MACHINE-TO-MACHINE SHARING OF WAYLINE DEVIATION INFORMATION

CROSS REFERENCE TO RELATED APPLICATION

This application claims the benefit of U.S. Provisional Application No. 62/212,625 filed Sep. 1, 2015, which is hereby incorporated by reference in its entirety.

TECHNICAL FIELD

The present disclosure is generally related to agriculture technology, and, more particularly, computer-assisted farming.

BACKGROUND

Recent efforts have been made to automate or semi-automate farming operations. Such efforts serve not only to reduce operating costs but also improve working conditions on operators and reduce operator error, enabling gains in operational efficiency and yield. For instance, agricultural machines may employ a guidance system to reduce operator fatigue and costs.

BRIEF DESCRIPTION OF THE DRAWINGS

Many aspects of wayline deviation sharing systems and methods can be better understood with reference to the following drawings. The components in the drawings are not necessarily to scale, emphasis instead being placed upon clearly illustrating the principles of wayline deviation sharing systems and methods. Moreover, in the drawings, like reference numerals designate corresponding parts throughout the several views.

DESCRIPTION OF EXAMPLE EMBODIMENTS

Overview

In one embodiment, a method comprising wirelessly receiving a signal comprising information about a deviation to a first wayline; and applying the deviation to a second wayline.

Detailed Description

Certain embodiments of wayline deviation sharing systems and methods are disclosed that enable a first machine to share a wayline with a second machine and also share, in real time, any deviations to the wayline, enabling the second machine to make adjustments in response to the deviations to thereby preserve a desired spatial relationship with the first machine. Both wayline and any wayline deviation information are shared between the machines via a wireless communications link, such as via a wireless machine-to-machine network. In one embodiment, the deviation information is prompted by (e.g., originates from) a nudge command activated by an operator, or in some embodiments, activated automatically in response to sensor input. The nudge command introduces an off-set (a deviation) to the original wayline without changing the original wayline, enabling a return to the original wayline at any time, such as via operator input or automatically in response to sensor input. For instance, unlike a manual steer maneuver (e.g., by the operator avoiding an obstacle), certain embodiments of wayline deviation sharing systems that use wayline nudge avoid the loss of autoguidance or navigation when implementing the deviation. The deviation may be a conventionally-used left or right deviation (left or right nudge). In some embodiments, deviations in the fore and aft direction (e.g., via a momentary change in speed prompted by the nudge command) may also be implemented in certain embodiments, such as to enable a change in the targeted receiving location of a grain cart where a combine harvester is depositing the grain. In other words, a fore/aft nudge may be implemented in some embodiments, enabling an operator to adjust the position of a first machine forward or backward relative to a second machine (without changing the corresponding wayline). The deviation information includes the deviation (based on the fore and aft and/or L/R nudge command) and optionally additional information such as positioning of the machine (e.g., tilt), among other information. In one embodiment, a wayline deviation sharing system comprises plural machines, with a first machine comprising logic that provides a first wayline that dictates a path the first machine follows to traverse (e.g., navigate) a field and at least a second machine that receives the first wayline and in turn generates a second wayline based on the first wayline. The second wayline is parallel to the first wayline. In one embodiment, and based on a nudge command entered at the first machine, the first machine navigates the field in a manner that deviates from the first wayline. This deviation is associated with deviation information that is communicated wirelessly (e.g., via direct radio frequency communications between transceivers and/or via telemetry via an intermediary carrier/area network(s)) to the second machine, which may apply the received deviation to the second wayline to enable a deviation in the manner the second machine navigates the field, thereby maintaining a desired spatial relationship among the first and second machines. The deviation or generally deviation information applied to the second wayline by the second machine may be implemented immediately (or substantially immediately), or after a predetermined delay that enables the second machine to ensure comprehensive yet efficient coverage. In some embodiments, one or both of the machine operators may selectively prevent the deviation information from being shared (e.g., conditionally shared) with and/or implemented by the second machine.

Digressing briefly, guidance or autoguidance (also known as autosteer) systems are fairly common to increase the accuracy of the task at hand, reduce operator fatigue, and/or reduce overlap (or underlap) of operations. Such guidance systems typically work by one machine defining a method of traversing a field (e.g., parallel or contour waylines) and then sharing such data with other machines via such mechanisms as removable storage (e.g., USB sticks, SD cards, etc.) or wireless communications. For instance, the generation of wayline data includes data points associated with a path to be worked, and may include using a worked edge (and unworked edges) as a basis for the wayline generation. As is known, data points may be established by a previous pass of the field by the agricultural machine (and/or other agricultural machine), and the adherence to the various paths may be achieved through the implementation, in whole or in part, by an autoguidance system, or referred to also as a guidance system (e.g., using software/firmware and a global navigation satellite systems (GNSS) receiver, such as one configured for global positioning systems (GPS), GLONASS, Galileo, among other constellations). For instance, an agricultural machine, such as a combine harvester, may traverse a field row collecting crop material, and a guidance system, such as a Global Positioning System (GPS) on the combine harvester, may record the path followed along with additional data such as the harvester's speed, direction, amount of crop material collected, and fuel remaining. Similarly, other machines, such as a planter or sprayer may record data such as remaining supply volume of their respective consumables (e.g., seeds, water, herbicides, and/or pesticides). Additional information on wayline generation using a working edge and a header or other implement width may be found in commonly-assigned patent application publication 20110160961.

While the sharing of waylines permits multiple machines to operate in the same work area/field, these conventional methods are also rather inflexible. For instance, such conventional methods include constraints that deem the only way to traverse the field and still maintain auto-guidance is to follow the prescribed wayline throughout the field. In some conventional systems, the wayline determinations are successive and proximate, depending on a prior wayline determination (e.g., based on header width and the prior wayline). The sharing of waylines enables a lead machine, such as a combine harvester, to enable the automatic guidance systems of other machines to maintain a desired spatial relationship among the machines. However, one shortcoming to conventional autoguidance systems is that, if the operator of the combine harvester engages wayline nudge or otherwise causes the combine harvester to deviate from the initial wayline (e.g., to avoid an obstacle or more accurately align the machine with the crop being harvested), the spatial relationship between the two machines changes. With certain embodiments of wayline deviation sharing systems, the deviation information comprising the deviation by the first machine is shared (via a wireless communications link) with the second machine, enabling the follower machine to implement a like deviation (at the same time or delayed) in wayline navigation to ensure proper coverage and/or to maintain the proper spatial relationship (thus avoiding, for instance, spillage of grain onto the ground or insufficient field coverage).

Having summarized certain features of wayline deviation sharing systems of the present disclosure, reference will now be made in detail to the description of wayline deviation sharing systems and methods as illustrated in the drawings. While wayline deviation sharing systems and methods will be described in connection with these drawings, there is no intent to limit it to the embodiment or embodiments disclosed herein. For instance, in the description that follows, one focus is on agricultural machines embodied as a combine harvester, a tractor pulling a grain cart, and a self-propelled grain truck, though it should be appreciated that some embodiments of wayline deviation sharing systems and methods may be used in other machines for the same or other industries, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of wayline deviation sharing systems and methods as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the machine looking forwardly. Further, note that reference herein to a first or second machine or a first or second wayline in the detailed description does not necessarily limit the claims to like-referenced machines or waylines (e.g., a first machine referenced in the detailed description does not necessarily mean the same machine referenced as a first machine in the claims), respectively, and first and/or second term usage should be read in the context of the entire claim.

Figure 1:
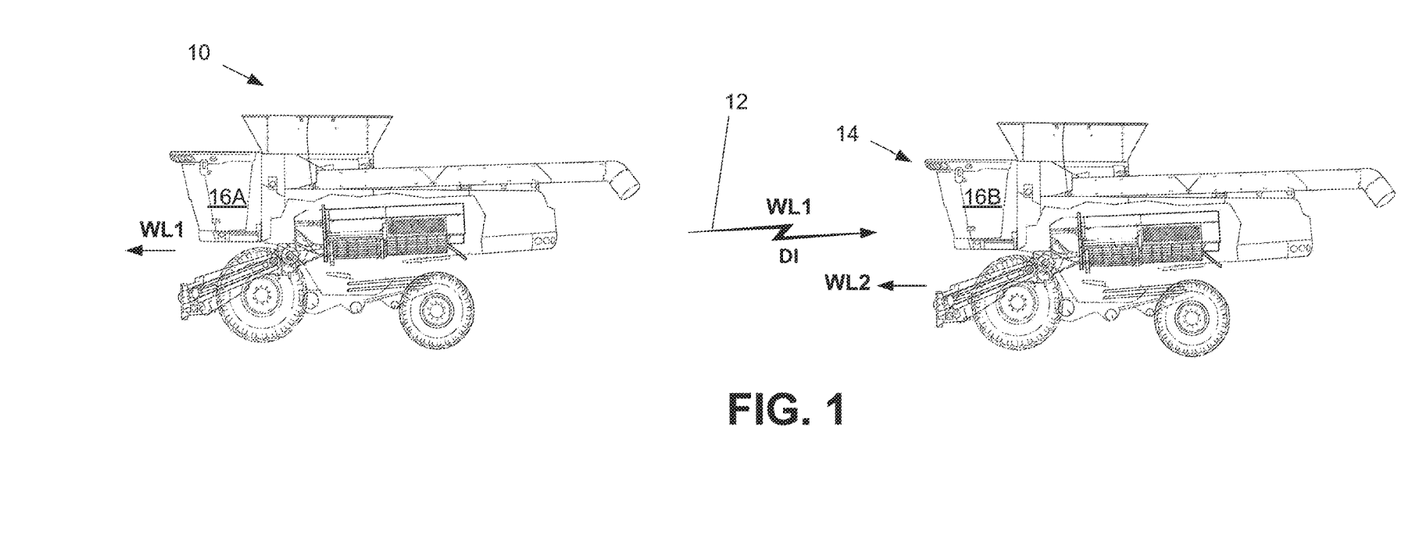
FIG. 1 is a schematic diagram that illustrates example machines that use an embodiment of a wayline deviation sharing method.

Referring now to FIG. 1, shown is a schematic diagram that illustrates some example machines that use an embodiment of a wayline deviation sharing method. Note that the quantity or type of machines is one example among many, and that in some embodiments, other quantities and/or additional or different types of machines may be used in some embodiments. In the depicted example, a combine harvester 10 is shown (without an attached header for brevity) as a lead machine that communicates a wayline (or waylines) and any deviation information via a wireless (e.g., radio frequency, such as via IEEE 802.11 among other communications protocols or mechanisms, such as via optical, infrared, acoustic/sound, among other forms of communication over air) communications link 12 to a combine harvester 14 serving as a follower machine. Note that the terms lead and follower may be terms that are relative as to spatial orientation and/or as to supervisory/subordinate control and command roles. For instance, the combine harvesters 10 and 14 may operate in concert to harvest a field such that the combine harvester 14 follows the combine harvester 10 in a staggered formation. Each of the combine harvesters 10 and 14 comprises a respective control system 16 (e.g., 16A, 16B) that includes a transceiver that transmits and/or receives waylines and/or deviation information based on wayline nudge commands. The control systems 16A and 16B also comprise a respective global navigation satellite systems (GNSS) receiver and autoguidance software/firmware (collectively, an autoguidance system or equivalently, automatic guidance system) that autonomously guide the machines 10 and 14 according to waylines and enables the implementation of deviations or deviation information applied to the waylines. For instance, the combine harvester 10 shares a first wayline (e.g., WL1) with the combine harvester 14 via the wireless communications link 12, enabling the autoguidance system of the control system 16B of the combine harvester 14 to generate a second wayline (e.g., WL2) that is parallel to the shared first wayline but separated therefrom an appropriate distance to enable the combine harvester 14 to harvest a full swath immediately adjacent the harvested swath of the combine harvester 10. If the operator of the combine harvester 10 adjusts the first wayline using a wayline nudge (which gives rise to a nudge command received by autoguidance software of the control system 16A), the corresponding deviation information is communicated via the wireless communications link 12 to the control system 16B of the combine harvester 14. The control system 16B comprises an autoguidance system that applies a deviation to the second wayline based on the deviation information. It should be understood that the roles as leader and follower may be reversed in some implementations, and thus in certain embodiments of wayline deviation sharing systems, depending on the application, either of the control systems 16A or 16B may serve as a communicator of waylines/deviations or recipient of the same. It should be appreciated within the context of the present disclosure that, though shown with two combine harvesters 10 and 14 (with headers omitted for brevity), some embodiments may utilize additional combine harvesters and/or other machines (e.g., two or more tractors operating in staggered formation, two or more applicators operating in staggered formation, a combine harvester and a tractor/grain cart, etc.).

Further, though depicted as a wireless communications link 12 that enables direct (e.g., machine-to-machine) radio frequency communications, in embodiments where the control systems 16 are equipped with telemetry equipment, the communication of waylines and/or deviation information may be achieved via one or more intermediary external devices (e.g., servers, repeaters, cell towers, etc.) and/or networks (e.g., carrier network, the Internet, local area networks, etc.). In one example operation, the control system 16A of the combine harvester 10 provides (e.g., generates, or alternatively, uses based on stored or up/downloaded information) a first wayline that the combine harvester 10 uses to autonomously traverse a given field, and further communicates via the wireless communications link 12 the first wayline to the control system 16B of the combine harvester 14. The control system 16B of the combine harvester 14 uses the first wayline to compute a second wayline that the combine harvester 14 uses to autonomously traverse the field in a manner that is parallel to the first wayline. In other words, the first wayline used by the combine harvester 10 is parallel to the second wayline used by the combine harvester 14. The control system 16B of the combine harvester 14 may store (e.g., locally, or in some embodiments, remotely) machine information about the combine harvester 10 to enable computation of the second wayline in known manner, such machine information including header width, unloading auger tube length, machine speed (or targeted machine speed), direction (or targeted direction), offset (e.g., based on header width), etc. In some embodiments, the machine information may be entered into the control system 16B by the operator, such as via manual input through a user interface, upload (e.g., via memory stick or other computer readable medium), or download (e.g., via wireless communication between the machines 10 and 14). In some embodiments, the specifications of each machine 10 and 14 may be accessed wirelessly from an external device, such as a field server or a remotely located server accessed via telemetry/network-connectivity functionality associated with the control system 16. In one embodiment, the waylines are determined in a manner that enables comprehensive and efficient coverage of the field by the machines 10 and 14 while reducing overlap, thus requiring a predetermined spatial relationship between the machines 10 and 14.

In short, deviation information based on a nudge command implemented at the combine harvester 10 may be communicated directly via the wireless communications link 12 (or indirectly via one or more networks and/or external devices) from the control system 16A to the control system 16B for use in determining the deviation to be applied to the second wayline by the control system 16B of the combine harvester 14, thus enabling maintenance of the desired spatial relationship between the machines 10 and 14.

Figure 2A:
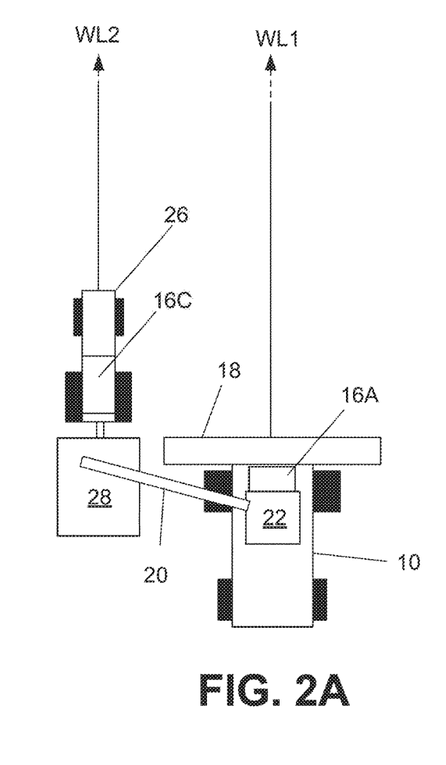
FIGS. 2A-2C are schematic diagrams that illustrate an embodiment of a wayline deviation sharing method where a combine harvester communicates wayline deviation information to a tractor that is pulling a grain cart.
Figures 2B, 2C:
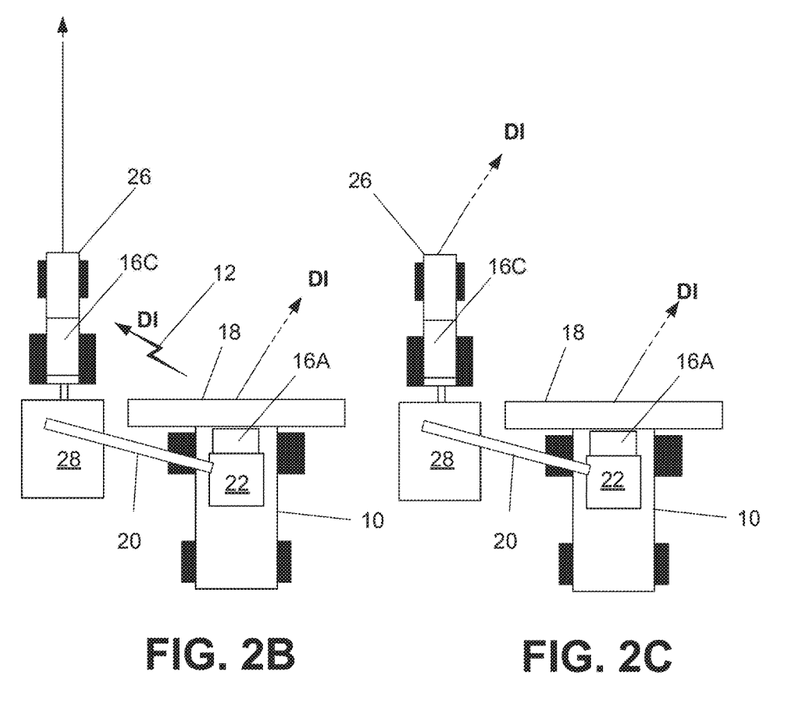

Referring to FIGS. 2A-2C, shown are schematic diagrams that illustrate an embodiment of a wayline deviation sharing method where a combine harvester communicates wayline deviation information to a tractor that is pulling a grain cart. In this example, the combine harvester 10 is shown with a header 18, an unloading auger tube 20 extending from the combine harvester 10, and a grain bin 22. The combine harvester 10, as is known, may harvest a field according to a first wayline (WL1, as shown in FIG. 2A) and in cooperation with a machine comprising a tractor 26 that tows a grain cart 28. Note that, though the follower machine is shown embodied as a tractor 26, in some embodiments, other and/or additional machines may be used, including a grain truck in place of or in addition to the tractor/grain cart combination, or a different machine to perform the towing function or other function(s). The control system 16A of the combine harvester 10 may have previously shared the first wayline with a control system 16C (which includes an autoguidance system) of the tractor 26, such as when the tractor 26 approaches the combine harvester 10 to offload grain from the combine harvester 10 to the grain cart 28. The shared first wayline is the wayline followed by the control system 16A (e.g., the autoguidance system component) of the combine harvester 10. Using the shared first wayline, the control system 16C of the tractor 26 generates a second wayline (WL2) that is parallel to the first wayline but separated an appropriate distance to enable the grain cart 28 to align with the discharge end of the unloading auger tube 20 of the combine harvester 10. In other words, the second wayline used by the tractor 26 is determined in conventional manner (e.g., considering header width or stored offset, (targeted or real time) machine speed, (targeted or real time) heading, unloading auger tube length, etc.) based on the first wayline, such that the combine harvester 10 can efficiently discharge grain from the unloading auger tube 20 while both machines 10 and 26 are navigating across the field.

If the operator of the combine harvester 10 uses wayline nudge (resulting in issuance of a nudge command to the control system 16A) to apply a deviation to the first (shared) wayline while the tractor 26 autonomously navigates the field according to the second wayline, the distance between the two machines 10 and 26 changes and, in a conventional system, the grain cart 28 may not be optimally aligned with the discharge end of unloading auger tube 20. In the depicted embodiment using a wayline deviation sharing method, and referring in particular to FIG. 2B, the control system 16A of the combine harvester 10 automatically shares the deviation information (DI) associated with the wayline nudge with the control system 16C of the tractor 26, enabling the autoguidance function of the control system 16C to apply the deviation to the second wayline using the deviation information to preserve the desired separation between the two waylines as shown in FIG. 2C with the different headings (e.g., represented by the parallel arrowheads that are pointed in a different direction than those shown in FIG. 2A). For instance, similar to the illustration and associated description of FIG. 1, the combine harvester 10 communicates via the wireless communications link 12 the deviation information (corresponding to its impending deviation to the first wayline) to the tractor 26 to enable the maintenance of the desired spatial relationship between the machines 10 and 26. Note that, since the tractor 26 is unlikely to be a lead machine in the depicted implementation, in some embodiments, the control system 16C used by the tractor 26 may comprise fewer components than the controls systems 16A and/or 16B described previously in association with FIG. 1, though in some embodiments (such as those illustrated in association with the detailed description), the control systems 16 (e.g., 16A, 16B, and 16C) may each comprise the same or similar functionality.

In one embodiment, the deviation applied to a given wayline may be the direct result of operator intervention at a user interface (e.g., display terminal or multi-function handle). For instance, an operator may desire to use wayline nudge to navigate the combine harvester 10 around an obstacle in the field, or correct for a drift in machine travel, and hence activate, at the user interface, the nudge feature, which in turn prompts a nudge command to the control system 16A. The control system 16A applies the corresponding deviation to the first wayline and wirelessly communicates the deviation (e.g., as deviation information) to the tractor 26 (and/or other machine(s)). In one embodiment, the deviation information may be embodied as data in the form of one or more values corresponding to the nudge command. For instance, in the case of a nudge command triggered using a switch on a multifunction handle, activation of the switch may trigger the control system 16A to translate (e.g., via look-up table) the movement of the multifunction handle into deviation information embodied as a turning angle or heading, among possibly other information, that is used (e.g., issued as a command to steering componentry) to enable the combine harvester 10 to navigate around the obstacle and/or correct drift. The deviation information may be continually updated (and wirelessly communicated) based on movement of the multifunction handle, up until return to the original waylines. In some embodiments, the deviation information may comprise a single heading command wirelessly communicated to the tractor 26 and used until additional heading information (e.g., based on further input) enabling return to the original wayline is (e.g., wirelessly) received. The additional heading information may result in automatic return to the initial wayline (e.g., following a predetermined, autonomous return path to the original wayline), or may be based on a translation of the user interface orientation or position (e.g., multifunction handle position) to a given turning angle and/or heading until reaching the original wayline. The deviation information may be used by the control system 16 (e.g., control system 16C) of the recipient machine 26 to apply a corresponding deviation to the second wayline used by the tractor 26, resulting in a like deviation (substantially immediately or a delayed version) in waylines between the two machines 10 and 26. Note that in some embodiments, the deviation information may include other and/or additional information, such as the GNSS coordinates of the combine harvester 10, which may be continually updated throughout the time the deviation is implemented and for which the control system 16C of the tractor 26 may use to update the deviation to the second wayline. In some embodiments, the deviation may include a speed component of the combine harvester 10, and/or other information such as a flag (e.g., binary value) that enables the tractor 26 to determine whether to implement the deviation substantially immediately or after meeting a defined condition, such as after reaching an area adjacent to where the deviation information was communicated. In some embodiments, the deviation information may include a time component, wherein based on the speed of the combine harvester 10 and GNSS coordinates and/or heading, the control system 16A (or control system 16C in some embodiments) computes a time (e.g., absolute or relative time) that the control system 16C of the tractor 26 uses to determine when to implement the deviation.

In some embodiments, a nudge command may be issued automatically (without activation by an operator at a user interface). For instance, based on feedback from one or more sensors (e.g., visible light, acoustic, infrared, etc.) and machine visualization software or other components detecting an obstacle or drift, the control system 16A may automatically prompt a wayline nudge and corresponding communication of the deviation information to the tractor 26 for automatic implementation of the deviations at both machines 10 and 26. The resulting autosteer functionality of the combine harvester 10 (and tractor 26 upon receiving the deviation information) may be implemented according to a predetermined avoidance path, or based on an adaptive path (and optionally, a return path to the original wayline) based on sensor feedback. In some embodiments, the operator may be prompted to accept or deny the auto-implementation of the deviation, and in some embodiments, the control system 16 may prompt an operator to use wayline nudge based on sensor input.

Figure 3A:
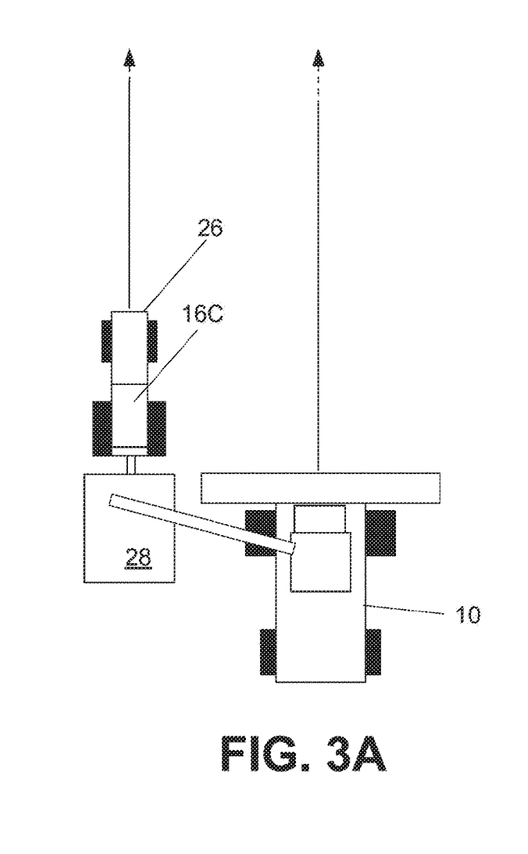
FIGS. 3A-3B are schematic diagrams of the machines depicted in FIGS. 2A-2C and that illustrate a wayline nudge used in an embodiment of a wayline deviation sharing method.
Figure 3B:
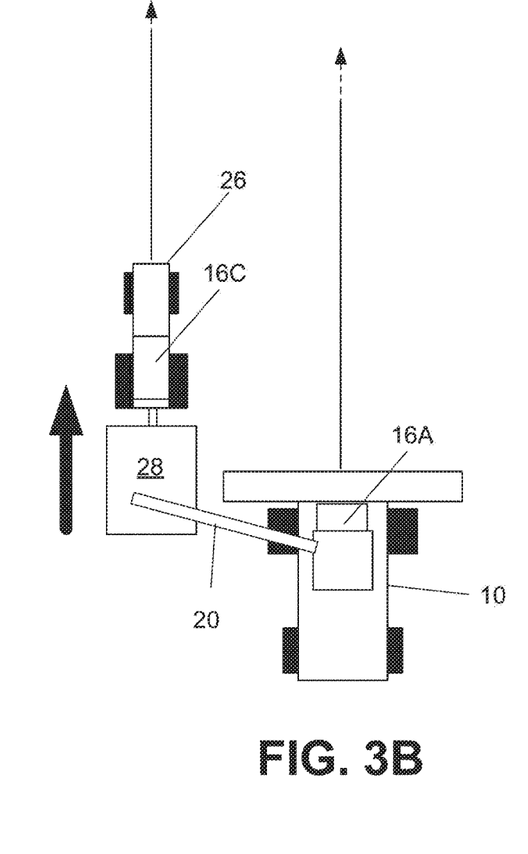

In some embodiments, the control system 16C of the tractor 26 may include a fore and aft nudge capability, in addition to the conventional left and right nudge capability, as illustrated in FIGS. 3A-3B. For instance, the tractor 26 may advance along the field at the same speed as the combine harvester 10 to maintain a fixed spatial relationship between the grain cart 28 and the combine harvester 10. An operator of the tractor 26 may wish to slightly adjust the position of the grain cart 28 forward or backward relative to the combine harvester 10 to, for instance, evenly fill the grain cart 28. The operator of the tractor 26 may engage a fore/aft nudge feature in the tractor 26 (e.g., at a user interface, such as a display terminal or using a switch hosted by a multifunction handle) to cause the tractor 26 to speed up (or slow down) momentarily (without altering the wayline) to adjust the position of the grain cart 28 relative to the discharge end of the unloading auger tube 20 of the combine harvester 10, as shown in FIG. 3B. In some embodiments, deviation information may be communicated wirelessly (not shown in FIGS. 3A-3B) to the combine harvester 10. In some embodiments, the control system 16A of a lead machine (e.g., the combine harvester 10) may possess this fore-aft nudge feature in addition to, or in lieu of, the control system 16C of the follower machine (e.g., the tractor 26). For instance, the deviation information may be wirelessly communicated (not shown in FIGS. 3A-3B) by the control system 16A to the control system 16C of the tractor 26 responsive to the nudge implemented at the combine harvester 10, such as to speed up or slow down, similar in manner to the communications shown in FIGS. 2A-2C.

Figure 4A:
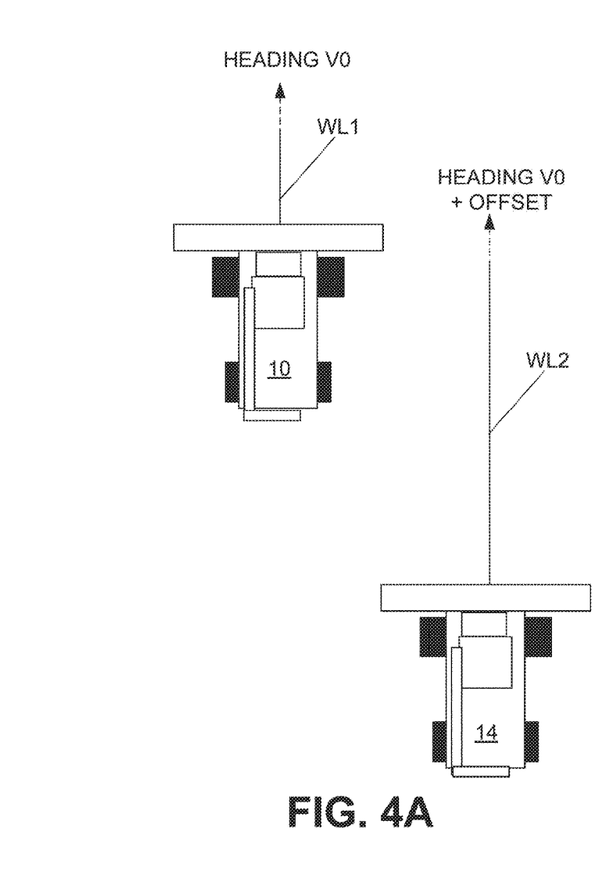
FIGS. 4A-4C are schematic diagrams that illustrate an embodiment of a wayline deviation sharing method where a combine harvester communicates wayline deviation information to at least one other combine harvester operating in staggered formation with respect to each other.
Figure 4B:
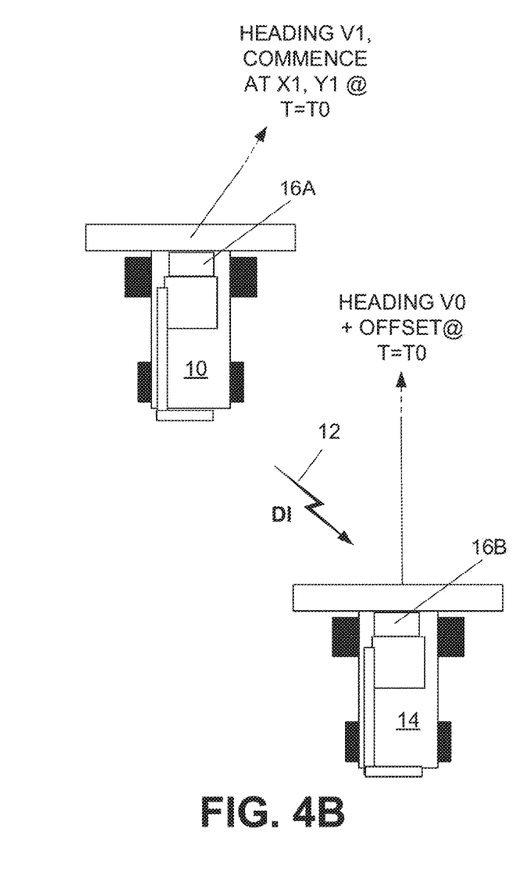
Figure 4C:
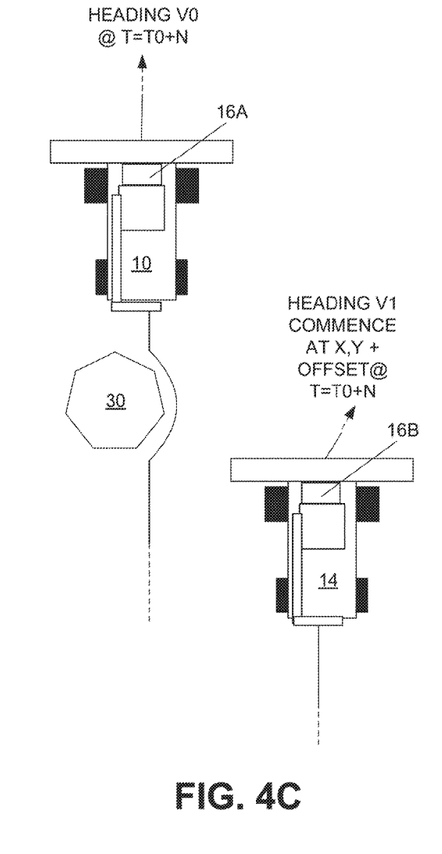

Referring now to FIGS. 4A-4C, shown are schematic diagrams that illustrate an embodiment of a wayline deviation sharing method where a combine harvester communicates wayline deviation information to at least one other combine harvester operating in staggered formation with respect to each other. In some embodiments, additional and/or different machines may be used. In particular, FIGS. 4A-4C show plural (e.g., two) combine harvesters 10 and 14 working a field in a staggered formation. In FIG. 4A, the combine harvester 10 is traversing the field according to a first wayline (WL1), which has a heading of V0. The combine harvester 14 is traversing the field according to a second wayline (WL2), which has a heading of V0 plus an offset from the first wayline (e.g., based on header width) to enable coverage of an adjacent swath with little or no overlap. The second wayline is based on a prior sharing of the first wayline to the combine harvester 14, according to known mechanisms. Based on a wayline nudge being prompted (e.g., via operator input), the control system 16A of the combine harvester 10 applies a deviation to the first wayline while wirelessly communicating over the wireless communication link 12 deviation information, corresponding to the applied deviation, to the control system 16B of the combine harvester 14, as shown in FIG. 4B. The deviation to the first wayline at the combine harvester 10 results in a heading, V1 at coordinates X1, Y1 at a given instance of time, such as T=T0. In this example, the heading enabled by the control system 16B of the combine harvester 14 remains at V0 at the same time T=T0. In other words, the control system 16B does not apply the deviation immediately or substantially immediately at the same time that the control system 16A applies the deviation. In general, either one of the machines may implement a delay so that the machine (e.g., combine harvester 14) receiving the wayline nudge information shifts at the same location as the sharing machine (e.g., the combine harvester 10) and not at the same time. Such a function may not be necessary if a tractor pulling a grain cart (e.g., tractor 26 and grain cart 28, FIG. 3A) is positioned immediately beside a combine harvester (e.g., combine harvester 10, FIG. 3A), yet may be necessary in a scenario where there exists staggered machines, such as to avoid leaving any land unworked or any crop unharvested. Referring to FIG. 4C, shown is the combine harvester 10 after it has returned to the first wayline after negotiating, in this example, an obstacle represented with reference numeral 30. The path traveled by the combine harvester 10 now (at time=T0+N, where N is in units of time and may be minutes or seconds) is according to the heading V0 of the first wayline. However, the control system 16B of the combine harvester 14 commences the deviation previously shared by the control system 16A of the combine harvester 10 (at T=T0) at a location adjacent the obstacle (X, Y+Offset (header)) to maintain a spatial relationship between deviation headings (V1 of combine harvester 10 spatially parallel to V1 of combine harvester 14, just a delayed temporal relationship) while ensuring no or minimal overlap of ground coverage by the same machines 10 and 14. The deviation is implemented at a time=T0+N (the snapshot in time depicted in FIG. 4C), which is after the implementation of the deviation by the combine harvester 10. Although shown as deviations at an angle to the waylines, in some embodiments, a similar process may be used for fore-aft nudges by the lead machine 10 relative to the following machine 14 to maintain spatial relationships with each other.

Note that either of two operators (e.g., of the machines 10 and 14) may prevent the deviation information (or equivalently, nudge information) from being shared with the follower machine (e.g., combine harvester 14 in this example). The operator of the first combine harvester (e.g., combine harvester 10) may selectively disable the nudge share feature, the operator of the second combine harvester (e.g., combine harvester 14) may be prompted (e.g., via visual or audible feedback presented at a user interface) to accept or reject the shared nudge information, or both. By way of example, if the operator of the first combine harvester (e.g., combine harvester 10) uses nudge to avoid a small obstacle, wherein the operator nudges the machine 10 to the left, then to the right to return to the original wayline location, he may not want the second combine harvester (e.g., combine harvester 14) to deviate from its course. Therefore, the operator may choose not to share the nudge information with the second combine harvester 14. Similarly, if the operator of the second combine 14 receives a prompt to accept or reject a shared wayline nudge, he may reject it if he recognizes that the first combine harvester 10 is merely temporarily deviating from its course to avoid a small obstacle.

Figure 5A:
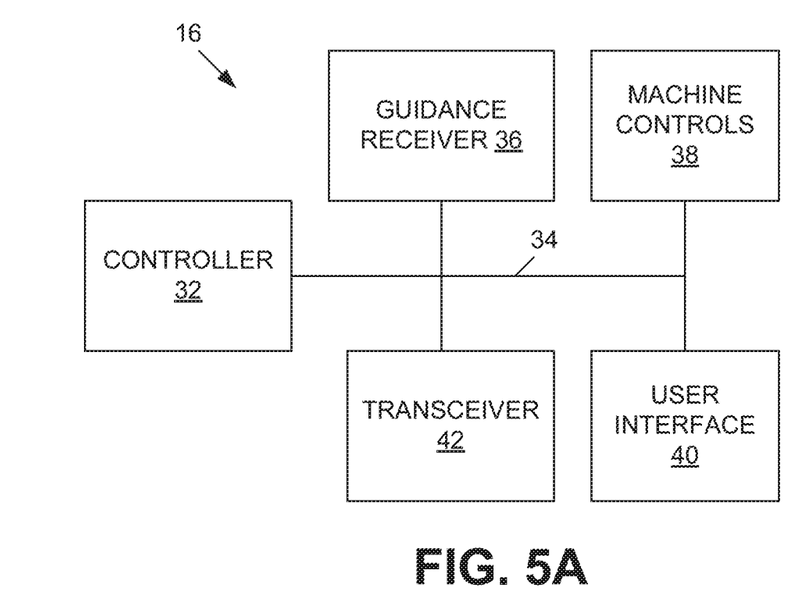
FIG. 5A is a block diagram showing an embodiment of a control system used by example machines of a wayline deviation sharing system.

Attention is now directed to FIG. 5A, which illustrates a control system 16 that may be used in a wayline deviation sharing system. It should be appreciated within the context of the present disclosure that some embodiments may include additional components or fewer or different components, and that the example depicted in FIG. 5A is merely illustrative of one embodiment among others. Further, in some embodiments, the same or similar architecture depicted in FIG. 5A may be used in each machine described herein (e.g., for control systems 16A, 16B and 16C). The control system 16 comprises a controller 32, which in one embodiment, may be configured as an electronic control unit (ECU). The controller 32 is coupled in a network 34 (e.g., a controller area network (CAN) or other network, and not limited to a single network) to a guidance or global navigation satellite systems (GNSS) receiver 36 (e.g., which includes the ability to access one or more constellations jointly or separately), machine controls 38, a user interface 40, and a transceiver (e.g., radio modem) 42. Though not shown, in some embodiments, the control system 16 may further include a cellular modem to enable internet connectivity via cellular network access. The machine controls 38 collectively comprise the various actuators, sensors, and/or subsystems residing on the given machine (e.g., from FIGS. 1-4C, combine harvesters 10, 14, tractor 26, etc.), including those used to control machine navigation (e.g., speed, direction (such as a steering system), etc.), implement (e.g., header or trailer) position, and/or control, internal processes, among others. The user interface 40 may be one or a combination of a keyboard, mouse, microphone, touch-type terminal (including a display device) or other types of terminals/display devices, joystick, such as a multifunction handle, steering wheel, or other devices (e.g., switches, such as a nudge switch) that enable input by an operator. The guidance receiver 36, as is known, may enable autonomous or semi-autonomous operation of the machine in cooperation with the machine controls 38 and the controller 32 (e.g., via autoguidance software residing in the controller 32). The transceiver 42 enables wireless communication with other transceivers or devices, such as transceivers residing within other machines. The transceiver 42 may be coupled to the controller 32 over a wireless connection, or via a wired connection in some embodiments, such as via the network 34.

The controller 32 is configured to receive and process the information from the transceiver 42, the guidance receiver 36, the machine controls 38, and/or the user interface 40. The controller 32, and generally the control system 16, is described below in kind from the perspective of a lead machine and a follower machine. When the control system 16 is hosted by a lead machine configured to send deviation information to another machine (e.g., a follower machine), the controller 32 may receive input from the user interface 40, such as from a wayline nudge switch, which the controller 32 interprets (e.g., via lookup table) as at least part of a wayline nudge command. In one embodiment, the controller 32 (acting in cooperation with autoguidance software) uses input from the user interface 40 (e.g., the wayline nudge activation and multifunction handle positioning) and in some embodiments, other information from the user interface 40 (e.g., speed translated from the multifunction handle position, input corresponding to whether to prevent sharing of deviation information, etc.), the machine controls 38 (e.g., speed, identification of information about an obstacle, etc.), and/or the guidance receiver 36 (e.g., GNSS coordinates, current heading) to generate deviation information (e.g., the desired heading and/or steer angle, speed, etc.). The deviation information may have a flag or time component to cause the delay of the application of the deviation at a follower machine, as indicated above. The controller 32 provides the deviation information (formatted to comply with the network protocol, such as J1939 messaging) to the transceiver 42, which in turn communicates (wirelessly) the deviation information to a follower machine. The controller 32 (acting in cooperation with autoguidance software) also applies the deviation information to the current wayline for causing deviation, by the lead machine, in path travel (in cooperation with the machine controls 38).

From the perspective of a follower machine, where the controller 32 is configured to receive the deviation information, the transceiver 42 receives the deviation information, formats the deviation information for appropriate messaging in the network 34, and provides the formatted deviation information to the controller 32. The controller 32 (acting in cooperation with autoguidance software) processes the formatted deviation information, and applies the deviation information to the wayline that is followed by the receiving machine (and implements the deviation in cooperation with the machine controls 38 of the follower machine). In some embodiments, the controller 32 (acting in cooperation with autoguidance software) may cooperate with the user interface 40 of the follower machine, such as to enable the denial (or permission) by an operator of the follower machine of the deviation.

Figure 5B:
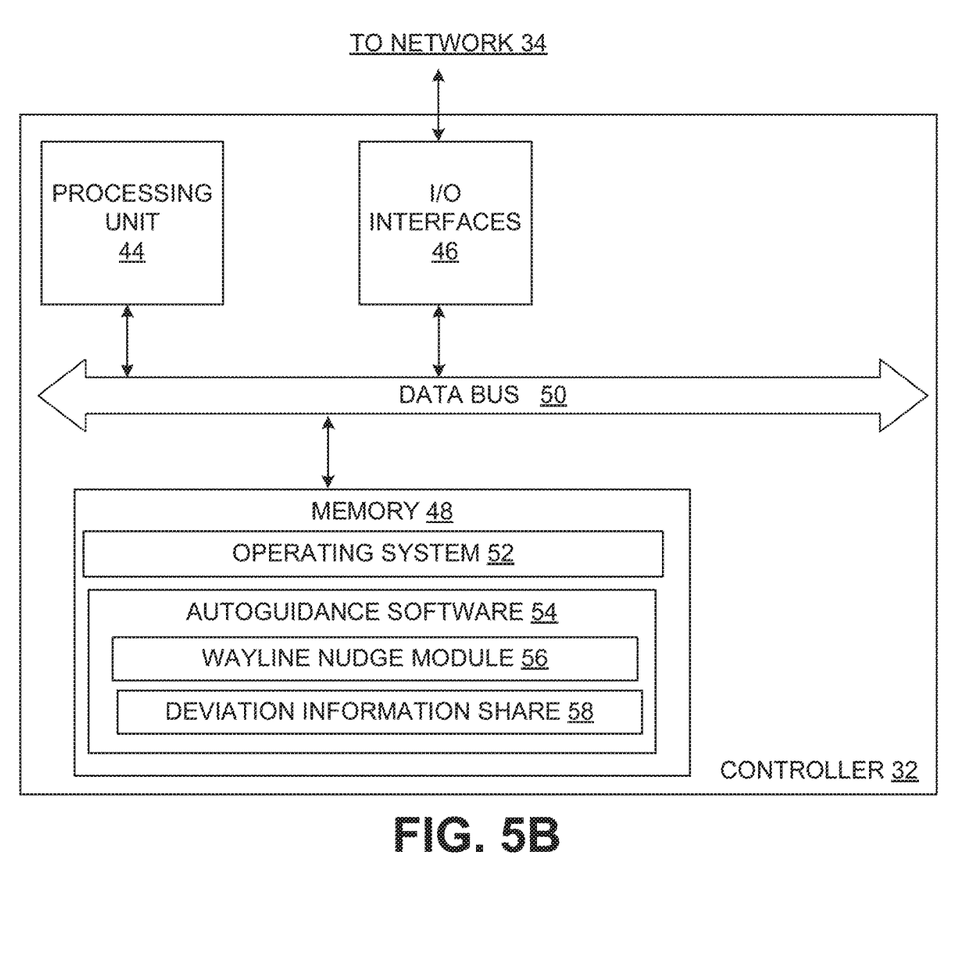
FIG. 5B is a block diagram showing an embodiment of a controller for the control system of FIG. 5A.

FIG. 5B further illustrates an example embodiment of the controller 32. One having ordinary skill in the art should appreciate in the context of the present disclosure that the example controller 32 is merely illustrative, and that some embodiments of controllers may comprise fewer or additional components, and/or some of the functionality associated with the various components depicted in FIG. 5B may be combined, or further distributed among additional modules or devices, in some embodiments. It should be appreciated that, though described in the context of residing in a machine (e.g., combine harvester 10, tractor 26, FIGS. 1-4C), in some embodiments, the controller 32 or its corresponding functionality may be implemented at least in part in an external computing device (e.g., located externally of the machine). Referring to FIG. 5B, with continued reference to FIG. 5A, the controller 32 is depicted in this example as an ECU configured as a computer system, but may be embodied as a programmable logic controller (PLC), Applications Specific Integrated Circuit (ASIC), Field Programmable Gate Array (FPGA), among other devices. It should be appreciated that certain well-known components of computer systems are omitted here to avoid obfuscating relevant features of the controller 32. Further in some embodiments, functionality of one or more of the components of the control system 16 may be embodied in the controller 32, such as the guidance receiver 36, user interface 40, etc. In one embodiment, the controller 32 comprises one or more processing units or equivalently, processors, such as processing unit 44, input/output (I/O) interface(s) 46, and memory 48, all coupled to one or more data busses, such as data bus 50. The memory 48 may include any one or a combination of volatile memory elements (e.g., random-access memory RAM, such as DRAM, and SRAM, etc.) and nonvolatile memory elements (e.g., ROM, hard drive, tape, CDROM, etc.). The memory 48 may store a native operating system, one or more native applications, emulation systems, or emulated applications for any of a variety of operating systems and/or emulated hardware platforms, emulated operating systems, etc. In some embodiments, the memory 48 may store one or more field maps that were recorded from a prior traversal of a given field, and/or various machine information, enabling autonomous (or semi-autonomous) traversal of a given field when activated. In the embodiment depicted in FIG. 5B, the memory 48 comprises an operating system 52 and autoguidance software 54, which includes a wayline nudge module 56 and a deviation share module 58. It should be appreciated that in some embodiments, additional or fewer software modules (e.g., combined functionality) may be employed in the memory 48 or additional memory. In some embodiments, a separate storage device may be coupled to the data bus 50, such as a persistent memory (e.g., optical, magnetic, and/or semiconductor memory and associated drives).

The autoguidance software 54, and in particular the wayline nudge module 56 and the deviation share module 58, enables the respective wayline nudge feature (L/R and fore-aft) described herein, the determination of a deviation to a wayline based on activation of the wayline nudge feature, the wireless sharing of the deviation, operator intervention in the processing of the deviation (e.g., prevent sharing or implementation thereof), and application of the deviation to the current wayline and return to the original wayline after implementation of the deviation. Though depicted in this example as embodied as part of the autoguidance software (which comprises a conventional component that generates waylines in known manner), in some embodiments, the functionality of the wayline nudge module 56 and the deviation share module 58 may be embodied as modules separate from, yet in communication with, the autoguidance software 54.

Execution of the software modules 54-58 may be implemented by the processing unit 44 under the management and/or control of the operating system 52. For instance, as is known, source statements of the software modules 54-58 may be translated by one or more compilers of the operating system 52 to assembly language and then further translated to a corresponding machine code that the processing unit 44 executes to achieve the functionality of the wayline deviation sharing system. Variations of this execution process are known, depending on the programming language of the software. For instance, if Java-based, the compiled output may comprise bytecode that may be run on any computer system platform for which a Java virtual machine or bytecode interpreter is provided to convert the bytecode into instructions that can be executed by the processing unit 44. Also, register transfer language (or other hardware description language) may be used to translate source code to assembly language, which the one or more operating system compilers translate to executable machine code. In some embodiments, the operating system 52 may be omitted and a more rudimentary manner of control implemented.

The processing unit 44 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 32.

The I/O interfaces 46 provide one or more interfaces to the network 34 and other networks. In other words, the I/O interfaces 46 may comprise any number of interfaces for the input and output of signals (e.g., analog or digital data) for conveyance over the network 34. The input may comprise input by an operator (local or remote) through the user interface 40 (e.g., a keyboard, multifunction handle, terminal, steering wheel, or mouse and/or other input device (or audible input in some embodiments)), and input from signals carrying information from one or more of the components of the control system 16, such as the guidance receiver 36, machine controls 38, and/or the transceiver 42, among other devices.

When certain embodiments of the controller 32 are implemented at least in part as software (including firmware), as depicted in FIG. 5B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 32 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
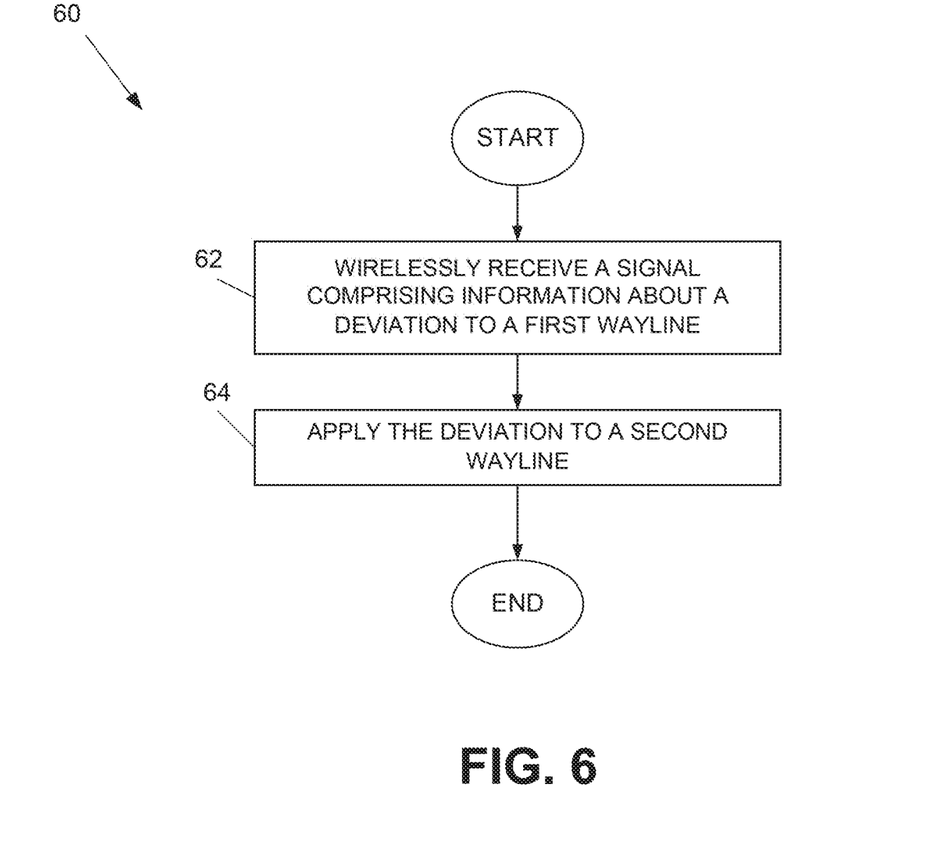
FIG. 6 is a flow diagram that illustrates an example embodiment of a wayline deviation sharing method.

Having described certain embodiments of a wayline deviation sharing system and method, it should be appreciated within the context of the present disclosure that one embodiment of wayline deviation sharing method, denoted as method 60 as illustrated in FIG. 6, comprises wirelessly receiving a signal comprising information about a deviation to a first wayline (62); and applying the deviation to a second wayline (64).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the wayline deviation sharing systems and methods, particularly, any "preferred" embodiments, are merely possible examples of implementations, merely set forth for a clear understanding of the principles of the wayline deviation sharing systems and methods. Many variations and modifications may be made to the above-described embodiment(s) of the wayline deviation sharing systems and methods without departing substantially from the spirit and principles of the disclosure. All such modifications and variations are intended to be included herein within the scope of this disclosure and protected by the following claims.

At least the following is claimed:

1. A system, comprising:
   a first machine, the first machine comprising:
      a first wireless transceiver;
      a first global navigation satellite system (GNSS) receiver;
      a first memory encoded with first autoguidance software; and
      a first processor configured by the first autoguidance software to:
         receive a nudge command that initiates a deviation to a first wayline without changing the first wayline;
         apply the deviation to the first wayline; and
         conditionally communicate, over a wireless communications link, a signal comprising information about the deviation to a second machine; and
   a second machine, the second machine comprising:
      a second wireless transceiver;
      a second global navigation satellite system (GNSS) receiver;
      a second memory encoded with second autoguidance software; and
      a second processor configured by the second autoguidance software to:
         wirelessly receive the signal via the wireless transceiver;
         apply the deviation to a second wayline; and
         cause guided navigation of the second machine according to the deviation at a location adjacent to where the signal comprising information about the deviation was wirelessly transmitted, the deviation to the first wayline being parallel with the deviation to the second wayline.

* * * * *